(12) United States Patent
Imamura (10) Patent No.: US 11,010,069 B2
(45) Date of Patent: May 18, 2021

(54) INFORMATION PROCESSING APPARATUS AND METHOD FOR MANAGING MEMORY USING ADDRESS CONVERSION

(71) Applicant: FUJITSU LIMITED, Kawasaki (JP)

(72) Inventor: Satoshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 16/261,848

(22) Filed: Jan. 30, 2019

(65) Prior Publication Data
US 2019/0258415 A1      Aug. 22, 2019

(30) Foreign Application Priority Data

Feb. 22, 2018   (JP) ............................. JP2018-029429

(51) Int. Cl.
*G06F 12/10*   (2016.01)
*G06F 3/06*    (2006.01)
*G06F 9/455*   (2018.01)

(52) U.S. Cl.
CPC .......... *G06F 3/0629* (2013.01); *G06F 3/0611* (2013.01); *G06F 3/0679* (2013.01); *G06F 9/45558* (2013.01); *G06F 12/10* (2013.01); *G06F 2009/45583* (2013.01)

(58) Field of Classification Search
CPC .. G06F 12/10; G06F 12/1009; G06F 2212/65; G06F 3/0629; G06F 3/0679; G06F 9/45558; G06F 2009/45583; G06F 12/109; G06F 12/1036; G06F 12/0284
See application file for complete search history.

(56) References Cited

U.S. PATENT DOCUMENTS

| | | |
|---|---|---|
| 2010/0037005 A1 | 2/2010 | Kim et al. |
| 2012/0216003 A1* | 8/2012 | Nakai ..................... G06F 9/524 711/163 |
| 2013/0198439 A1 | 8/2013 | Kurotsuchi et al. |
| 2014/0219021 A1 | 8/2014 | Trantham et al. |
| 2017/0351601 A1* | 12/2017 | Matsuzawa ......... G06F 12/0638 |

FOREIGN PATENT DOCUMENTS

| | | |
|---|---|---|
| JP | 2013-152676 | 8/2013 |
| JP | 2014-154166 | 8/2014 |

\* cited by examiner

*Primary Examiner* — Ernest Unelus
(74) *Attorney, Agent, or Firm* — Fujitsu Patent Center (57) ABSTRACT

An information processing apparatus includes a first memory configured to store first conversion information used for converting a virtual address to a physical address of a memory region to access data stored in the memory region; a second memory configured to store second conversion information used for converting a virtual address to a logical block address of a storage device to access data stored in the storage device; memory management circuitry configured to execute a first processor a second process, according to an access destination of a first virtual address, the first process includes address conversion on the first virtual address using the first conversion information or the second conversion information and memory access to the memory region based on a result of the address conversion, the second process including notification of a first logical block address associated with the first virtual address to an operating system.

10 Claims, 12 Drawing Sheets

FIG. 2A

AN EXAMPLE OF ADDRESS CONVERSION IN SSD

FIG. 2B

AN EXAMPLE OF ADDRESS CONVERSION IN SSD

FIG. 2C

AN EXAMPLE OF ADDRESS CONVERSION IN SSD

FIG. 3A

EXAMPLE OF MEMORY-MAPPED SSD

FIG. 3B

EXAMPLE OF MAPPING VIRTUAL ADDRESS TO LBA

FIG. 4

EXAMPLE OF RELATIONSHIP AMONG VIRTUAL ADDRESS, PAGE TABLE, AND LBA TABLE

EXAMPLE OF CRx

FIG. 12

INFORMATION PROCESSING APPARATUS AND METHOD FOR MANAGING MEMORY USING ADDRESS CONVERSION

CROSS-REFERENCE TO RELATED APPLICATION

This application is based upon and claims the benefit of priority of the prior Japanese Patent Application No. 2018-029429, filed on Feb. 22, 2018, the entire contents of which are incorporated herein by reference.

FIELD

The embodiment discussed herein relates to an information processing apparatus and a method for processing information.

BACKGROUND

An information processing apparatus exemplified by a computer system such as a server executes an address conversion process that maps different types of addresses in a uni- or bi-directionally and converts an address by referring to the mapping information of the address in the event of data access.

Such an address conversion process makes it possible to flexibly change, for example, a place where data is stored to a main memory device (hereinafter, sometimes abbreviated to a "memory") such as a Dynamic Random Access Memory (DRAM) and to a storing apparatus (hereinafter sometimes called a "storage device") such as a Solid State Drive (SSD) and a Hard Disk Drive (HDD). This enhances the speed of data access according to a place where data is stored.

For example, the address conversion process is applied to access to a virtual memory in which a virtual address that an application uses and a physical address of the memory are mapped, and access to a storage device in which a logical block address and a physical block address are mapped. Hereinafter, a logical block address is sometimes abbreviated to "LBA".

An address conversion process for access to a virtual memory is executed by a hardware device such as a Memory Management Unit (MMU) included in the Central Processing Unit (CPU). In contrast, an address conversion process for access to a storage device is executed by software such as an Operating System (OS).

Patent Document 1: Japanese Laid-open Patent Publication No. 2014-154166
Patent Document 2: Japanese Laid-open Patent Publication No. 2013-152676
Patent Document 3: U.S. Patent Application Publication No. 2010/0037005

As described above, since an address conversion process for access to a storage device such as an SSD is executed by software, enhancement in accessibility of the storage device may result in that the address conversion process by software has a possibility of becoming overhead in accessibility.

In recent years, a high-performance SSD adopting next-generation memory technology has appeared. A known example of such a high-performance SSD is an Intel Optane™ SSD adopting a technique of 3D XPoint™.

A high-performance SSD has low access latency and is as short as several to 20 µs in some cases. For this reason, an information processing apparatus provided with a high-performance SSD may further be annoyed by overhead in accessibility throughout an address conversion process by software.

SUMMARY

According to an aspect of the embodiments, an information processing apparatus including: a first memory configured to store first conversion information used for converting a virtual address to a physical address of a memory region to access data stored in the memory region; a second memory configured to store second conversion information used for converting a virtual address to a logical block address of a storage device to access data stored in the storage device; a processor coupled to the first memory and the second memory and configured to execute an operating system that controls access to data stored in the storage device using a logical block address; and memory management circuitry configured to execute a first process or a second process, according to an access destination of a first virtual address, the first process including address conversion on the first virtual address using one of the first conversion information and the second conversion information and memory access to the memory region based on a result of the address conversion, the second process including notification of a first logical block address associated with the first virtual address to the operating system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, description will now be made in relation to an embodiment of the present invention with reference to the accompanying diagrams. The embodiment to be detailed below is merely exemplary and does not have intention to exclude various modifications and applications of techniques not referred in the following embodiment. The following embodiment may be variously modified without departing from the scope thereof. Throughout the drawings used in the following embodiment, like reference numbers designate the same or substantially same parts and elements unless otherwise described.

(1) Embodiment (1-1) Example of Configuration:

First of all, description will now be made in relation to an example of the configuration of a computer according to an embodiment with reference to FIG. 1.

Figure 1:
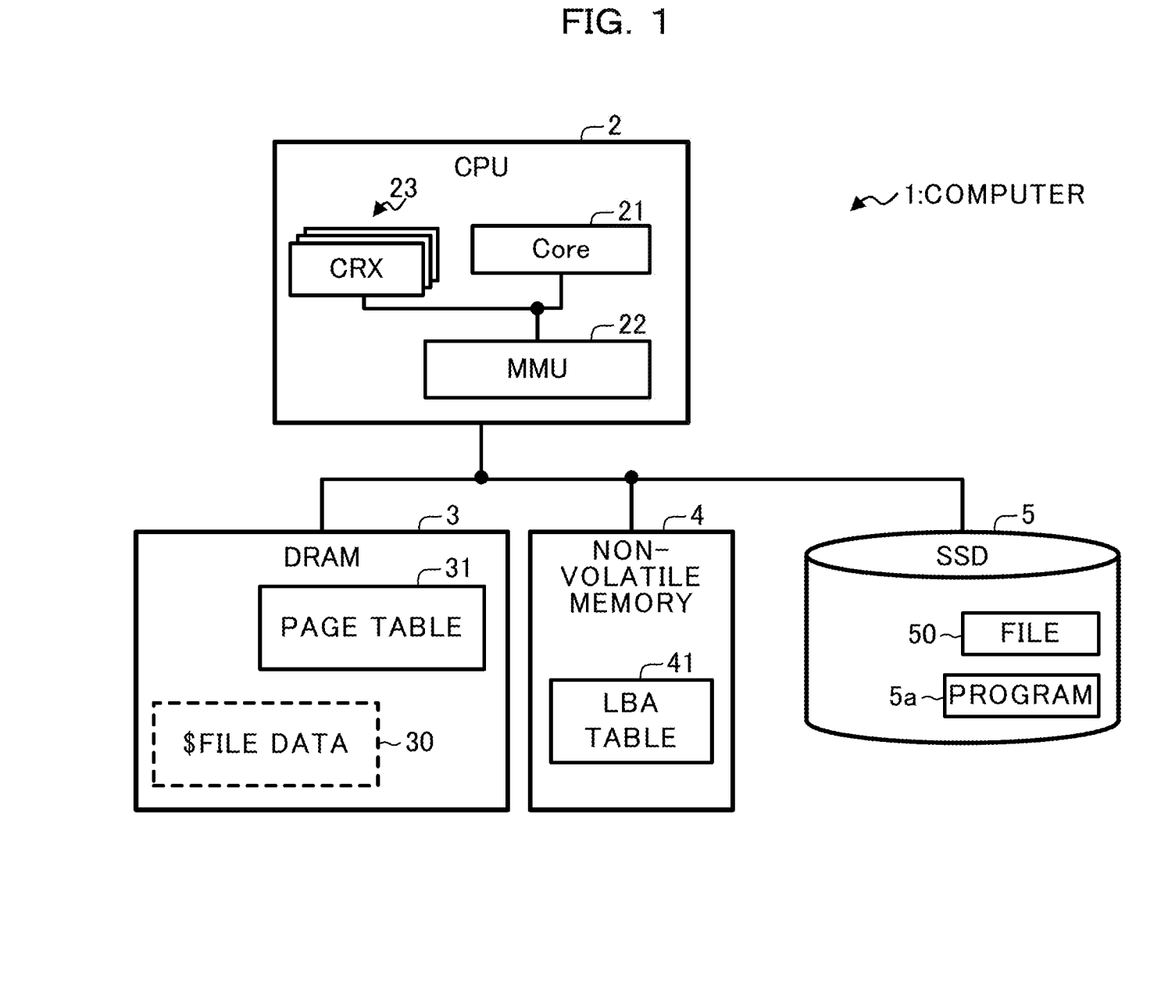
FIG. 1 is a block diagram schematically illustrating an example of the configuration of a computer according to an embodiment.

As illustrated in FIG. 1, a computer 1 may exemplarily include a CPU 2, a DRAM 3, a non-volatile memory 4, and an SSD 5.

The CPU 2 is an example of an arithmetic processing device that executes various controls and calculations. The CPU 2 may be bidirectionally-communicably connected to the blocks in the computer 1 via a bus.

As illustrated in FIG. 1, the CPU 2 may exemplarily include a core 21, an MMU 22, and multiple control registers (represented by "CRx" in FIG. 1) 23.

The core 21 achieves the functions of the OS and applications by executing programs (not illustrated) expanded in, for example, the DRAM 3.

The MMU 22 manages the DRAM 3. Besides, the MMU 22 of this embodiment may manage the non-volatile memory 4. An example of the MMU 22 may be a hardware device packaged (implemented) in the CPU 2.

Each CRx 23 is a control register used by the CPU 2 and is an example of a register accessible from an OS (not illustrated) executed by the core 21. For example, the CRx 23 may be used in control carried out by the core 21 and the MMU 22 as to be detailed below. Hereinafter, a particular CRx 23 among multiple CRxs 23 is represented by, for example, the CR0, CR1, and CR2 by changing the subscript "x".

An integrated circuit (IC) that mounts thereon a hardware device for managing a memory such as the MMU 22 may be used as the CPU 2. Examples of the IC are a Micro Processing Unit (MPU), a Digital Signal Processor (DSP), an Application Specific Integrated Circuit (ASIC), and a Field-Programmable Gate Array (FPGA).

Figure 7:
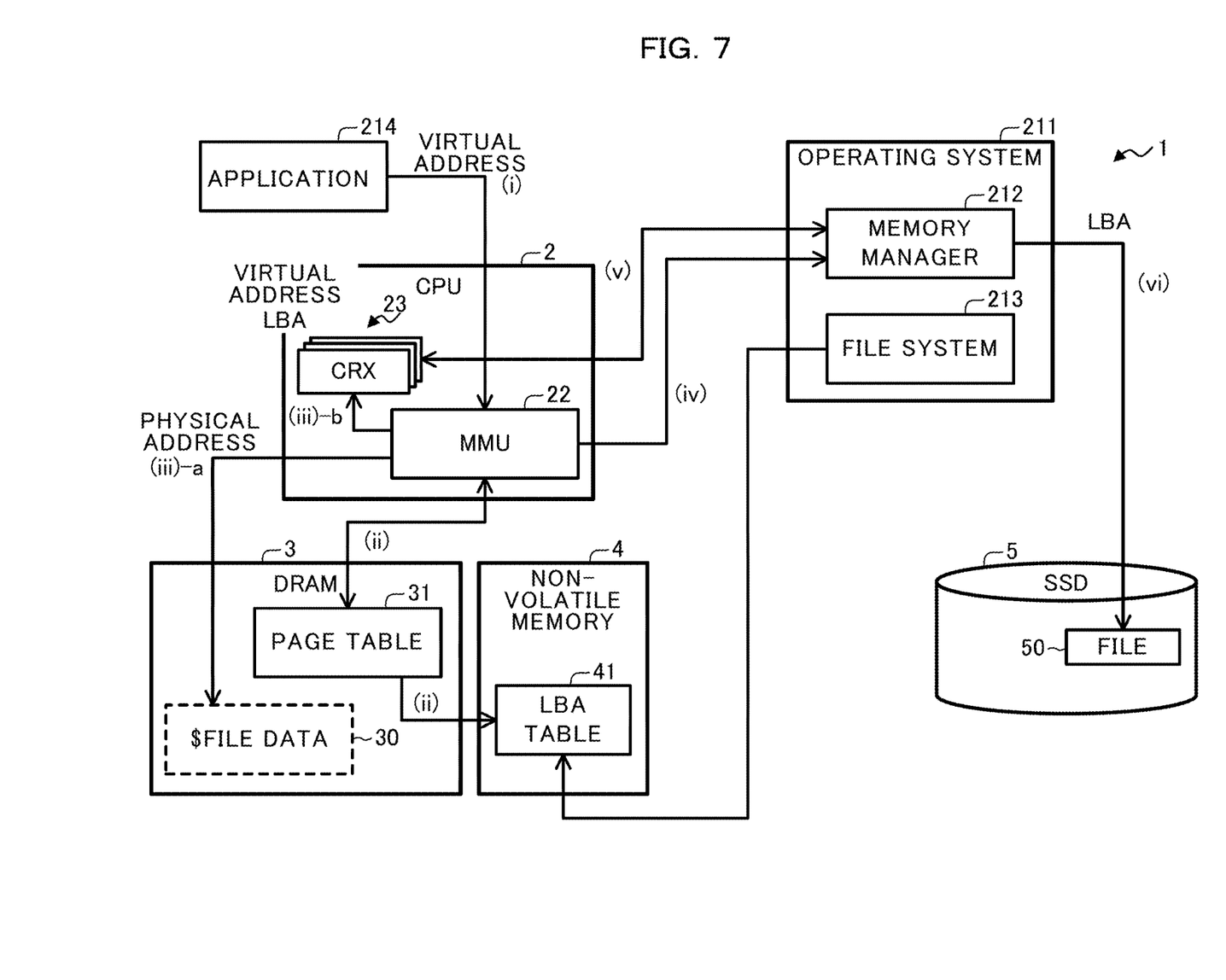
FIG. 7 is a block diagram schematically illustrating an operation performed by a computer according to an embodiment.

The DRAM 3 is a hardware device that can store information of various pieces of data and programs, and is an example of a first memory. As illustrated in FIG. 1, the DRAM 3 may store a page table 31, for example. In addition, the DRAM 3 may temporarily store file data 30 related to an access to the SSD 5 by the CPU 2. The file data 30 may be exemplarily stored in a memory region of the DRAM 3. In FIG. 1 and FIG. 7 to be detailed below, the file data 30 is represented by "$FILE DATA", which indicates a duplicate of data stored in the SSD 5.

The page table 31 is information that a virtual address that the application executed by the core 21 uses and a physical address indicating an address on a storing region of the DRAM 3 are mapped. In other words, the page table 31 corresponds to an example of first conversion information used for converting a virtual address to a physical address of a memory region to access data stored in the memory region.

The non-volatile memory 4 is a hardware device capable of storing information of various data pieces and programs, and is an example of a high-performance non-volatile memory or a second memory. An example of a "high-performance non-volatile memory" is a memory adopting a technique of 3D XPoint™. As illustrated in FIG. 1, the non-volatile memory 4 may store an LBA table 41, for example.

The LBA table 41 is information that a virtual address that the application executed by the core 21 uses and a logical block address (LBA) indicating a logical block position of a storing region on the SSD 5 are mapped. In other words, the LBA table 41 corresponds to an example of second conversion information used for converting a virtual address to a logical block address of a storage device to access data stored in the storage device.

In the present embodiment, the non-volatile memory 4 can be accessed in a unit of a byte like the DRAM 3, and the non-volatile memory 4, which is different from the SSD 5, may constitute a main memory device (main memory) in conjunction with the DRAM 3. This configuration achieves data access to the non-volatile memory 4 serving as the main memory device faster than data access to the SSD 5.

Providing that the LBA table 41 is stored in the DRAM 3, the capacity of the DRAM 3 to cache file data is reduced, so that a cache hit ratio in the DRAM 3 proportionally lowered. In contrast to the above, the present embodiment can suppress the reduction in the capacity of the DRAM 3 by storing the LBA table 41 in the non-volatile memory 4, so that the cache hit ration in DRAM 3 can be enhanced. For example, if the data size is 1 TB (256 M pages each having 4 KB), the size of the LBA table 41 is 2 GB (each page table entry to be detailed below is 8 B). This increases a capacity of caching file data 30 by about 2 GB.

In addition to the above, the manner of the present embodiment can ensure the persistence of the LBA table 41 because data stored in the non-volatile memory 4 does not decay when the computer 1 is powered off. For example, in the event of occurrence of a failure, high-speed recovery can be achieved without correcting the SSD 5.

For example, the capacity of the storing devices have a relationship of DRAM<high-performance non-volatile memory<SSD (flash memory). In relation to the access speed, the reading speed of the storing devices have a relationship of DRAM high-performance non-volatile memory>SSD (flash memory), the writing speed of the storing devices have a relationship of DRAM>high-performance non-volatile memory>SSD (flash memory). Adopting the non-volatile memory 4, which has a capacity larger than the DRAM 3 and has an access speed (reading speed) approximately the same as the DRAM 3, makes it possible to enhance the performance of the computer 1.

The SSD 5 is hardware device that stores information of various data pieces and programs, and is an example of a storage device. As illustrated in FIG. 1, the SSD 5 may store the file 50, for example.

The SSD 5 may be a NAND flash memory or may alternatively be an SSD adopting a "high-performance" non-volatile memory such as an Intel Optane™ SSD adopting a technique of 3D XPoint™. Various storing device such as a magnetic disk device such as a HDD, and a Storage Class Memory (SCM) may be used in place of or in addition to a semiconductor drive such as the SSD 5.

A flash memory is a kind of a non-volatile memory, but needs to be discriminated from the high-performance non-volatile memory. Hereinafter, the "non-volatile memory" means the high-performance non-volatile memory. In the following description, the non-volatile memory 4 and the SSD 5 are assumed to both be high-performance non-volatile memories, but the non-volatile memory 4 and/or the SSD 5 may alternatively be a flash memory.

The SSD 5 may store a program 5a that achieves all or part of the functions of the computer 1. The CPU 2 achieves the functions of the OS, a memory manager and a file system that the OS has, and applications executed by the OS by expanding the program 5a stored in the SSD 5 on the DRAM 3 and executing the expanded program 5a.

Likewise a HDD, the SSD 5 processes access by converting an LBA designated by the access into a Physical Block Address (PBA) indicative of a physical block position of the storing region on the SSD 5.

Figure 2A:
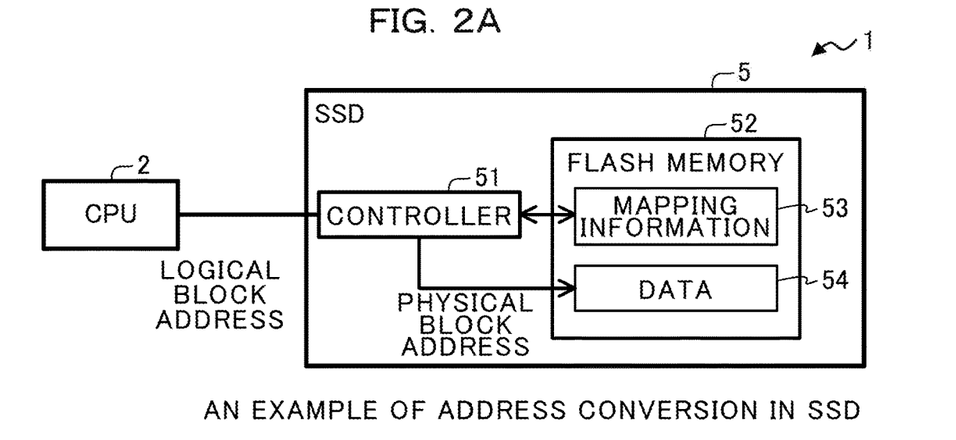
FIGS. 2A-2C are diagrams each illustrating an example of an address conversion process performed in an SSD.

As illustrated in FIG. 2A, for example, the SSD 5 may include a controller 51 that executes access control and a flash memory 52 that stores mapping information 53 and data 54. The controller 51 may obtain a PBA associated with an LBA by referring to the mapping information 53 and access to the data 54 stored in the obtained PBA.

Figure 2B:
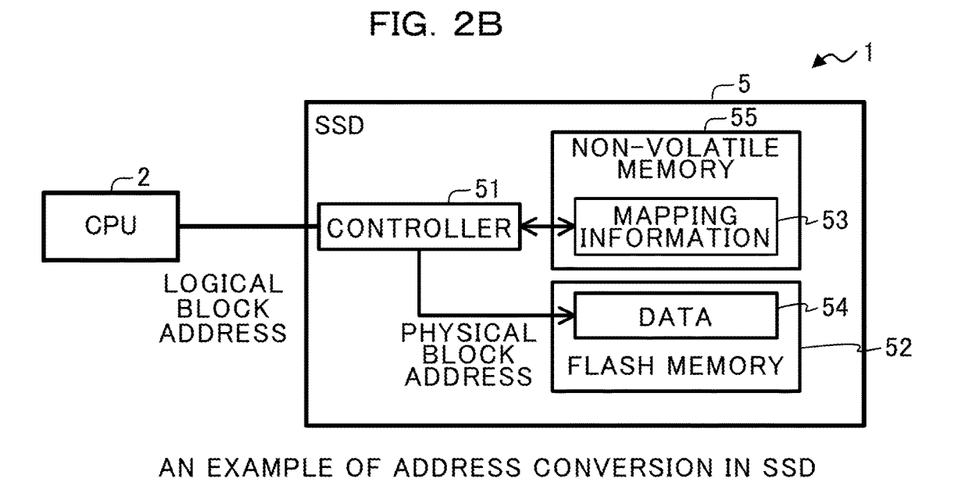
Figure 2C:
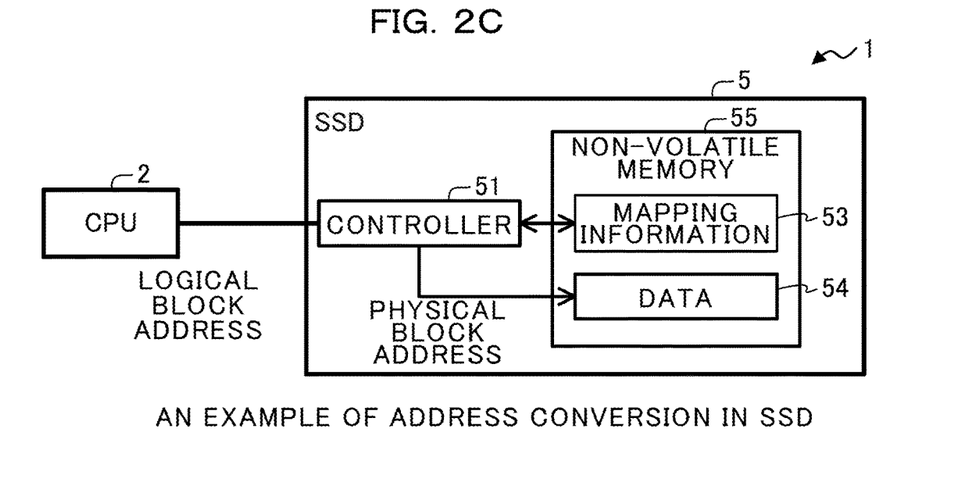

Alternatively, the SSD 5 may have a configuration illustrated in FIG. 2B that a non-volatile memory 55 stores the mapping information 53 or a configuration illustrated in FIG. 2C that the non-volatile memory 55 stores the mapping information 53 and the data 54.

The computer 1 may further include elements of an Interface (IF) device, an Input/Output (I/O) device, and a reading device in addition to the configuration of FIG. 1. The IF device is an example of a communication interface that controls connection and communication of the computer 1 to and with a non-illustrated network. The I/O device may include at least one of an input device such as a mouse and a keyboard, and an output device such as a touch-panel display and a Liquid Crystal Display (LCD). The reading device is an example of a reader that reads data and a program recorded in a recording medium. The program 5a may be downloaded from the network via the IF device and then stored in the SSD 5 or may be read from a recording medium via the reading device and then stored in the SSD 5.

Here, an example of a recording medium is a non-transitory recording medium, such as a magnetic/optical disk and a flash memory. Examples of the magnetic/optical disk are a flexible disk, a Compact Disc (CD), a Digital Versatile Disc (DVD), a Blu-ray disk, and a Holographic Versatile Disc (HVD). Examples of a flash memory are a USB memory and an SD card. Examples of a CD are CD-ROM, CD-R, and CD-RW. Examples of a DVD are DVD-ROM, DVD-RAM, DVD-R, DVD-RW, DVD+R, and DVD+RW.

(1-2) Description of Mapping of an Address:

When the CPU 2 is making access to the SSD 5, an address conversion in which a virtual address used (designated) by an application is converted into an LBA that the SSD 5 is to be used is executed. Hereinafter, description will now be made in relation to mapping of different kinds of address in the computer 1. As described above by referring to FIGS. 2A-2C, the SSD 5 carries out address conversion of an LBA to a PBA, but the following description omits the description of this address conversion.

Figure 3A:
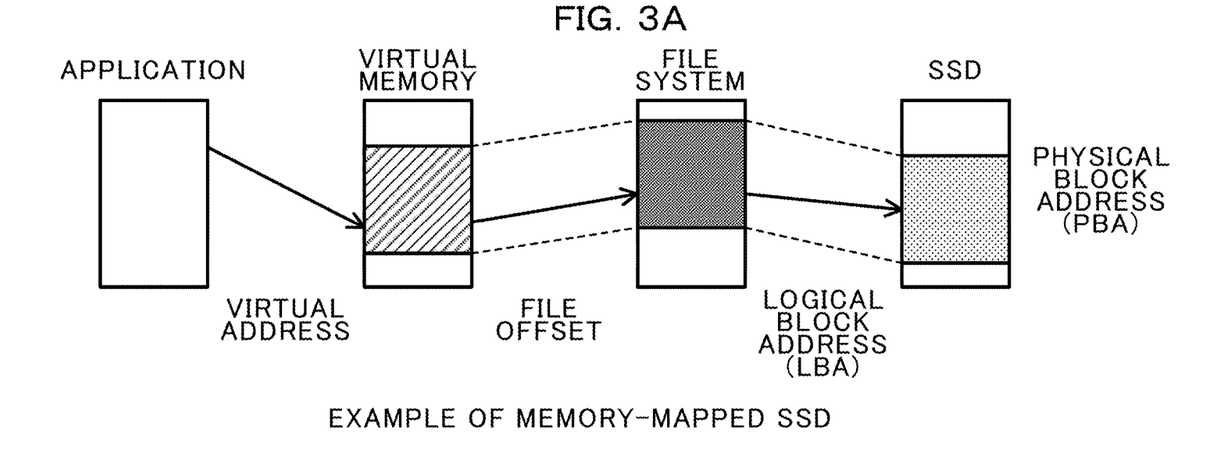
FIGS. 3A-3B are diagrams illustrating an example of mapping different types of addresses.

To begin with, a comparative example will now be detailed in which a storage device of a computer is used as a Memory-Mapped SSD. In this comparative example, as illustrated in FIG. 3A, the virtual address of a virtual memory is mapped to a file offset of a file system that the OS manages, and the file offset is mapped to the LBA. Here, a file system is a system that manages the data stored in the storage device by a file.

As the above, in a Memory-Mapped SSD, at least apart of the storing region on the storage device is managed to be a virtual memory in conjunction with the main memory device. Accordingly, when access to the storage device is to be made, the software carries out an address conversion process that converts in sequence of a virtual address, a file offset, and finally to an LBA.

Figure 3B:
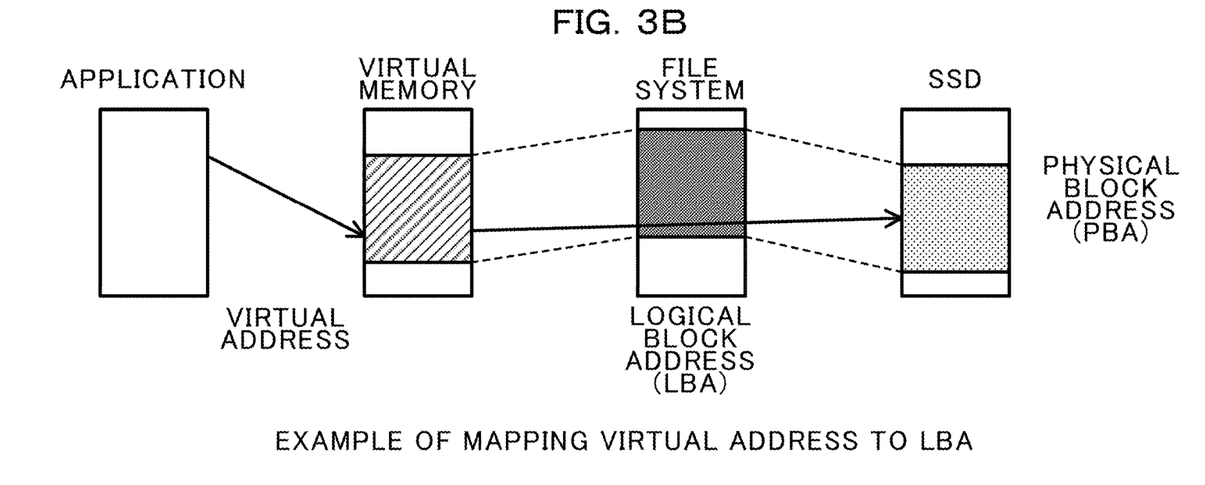

In contrast to the above, in the computer 1 of the present embodiment, the presence of the LBA table 41 makes it possible to directly map virtual address of the virtual memory to the LBA as illustrated in FIG. 3B. In this case, the software executes an address conversion process that converts a virtual address to an LBA to access the SSD 5.

The address conversion process of FIG. 3B does not include conversion of a file offset, so that the load caused by the address conversion by the software can be lowered and accordingly the overhead in storage access can be reduced.

Figure 4:
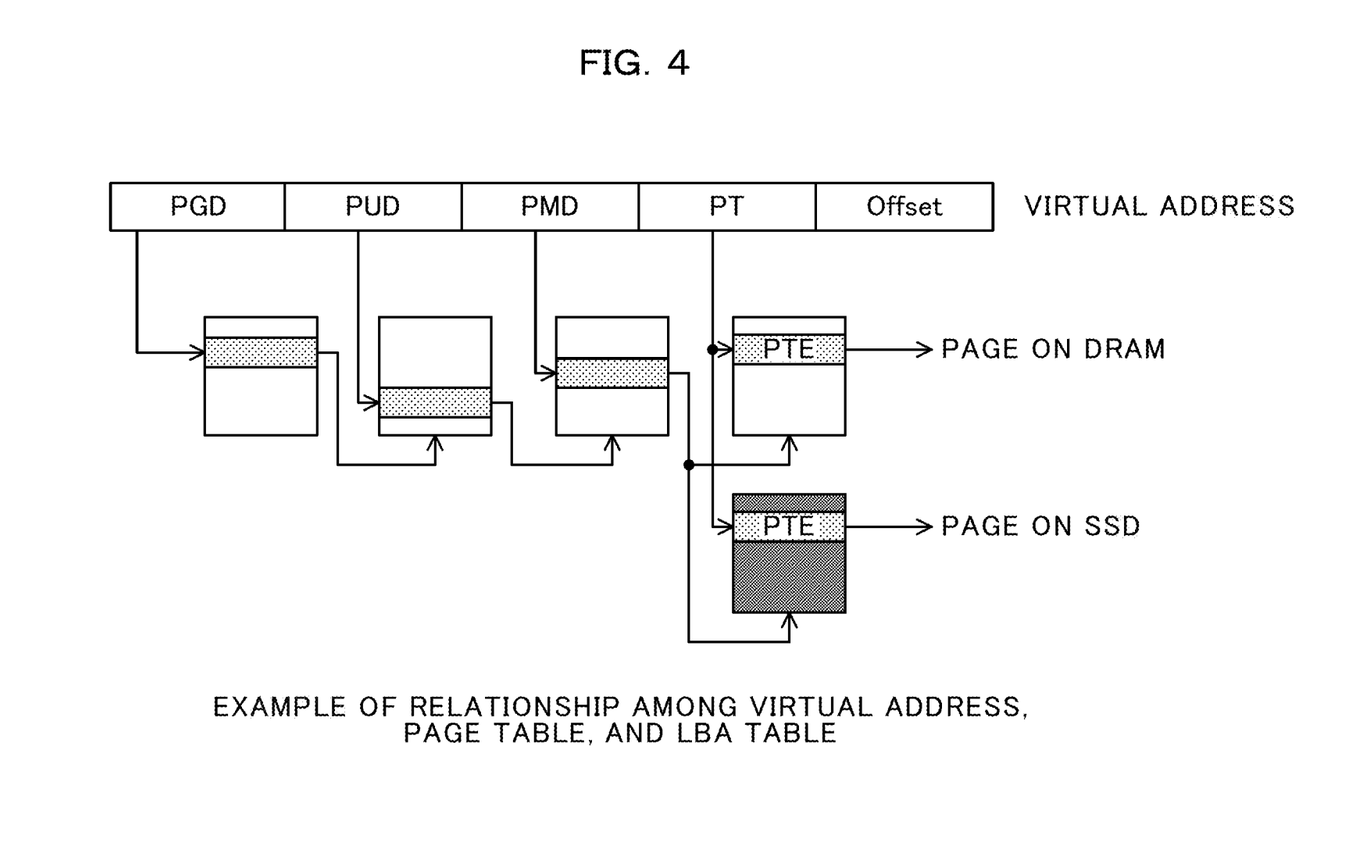
FIG. 4 is a diagram illustrating an example of a relationship among a virtual address, a page table, and an LBA table.

In a manner of address mapping illustrated in FIG. 3B, the relationship among a virtual address, the page table 31, and the LBA table 41 is one exemplarily illustrated in FIG. 4.

As exemplarily illustrated in FIG. 4, the bit string of a virtual address of the present embodiment may be divided into, in sequence from upper bits to lower bits, bit regions of a Page Global Directory (PGD), a Page Upper Directory (PUD), a Page Middle Directory (PMD), a Page Table (PT), and an Offset.

The page table 31 and the LBA table 41 are specified by these bit regions. For example, the bit value of the PGD region is indicative of an index that specifies the PUD; the bit value of the PUD region is indicative of an index that specifies the PMD; the bit value of the PMD region is indicative of an index that specifies a "page table" (i.e., the page table 31 or the LBA table 41); and the bit value of the PT region is indicative of an index that specifies a Page Table Entry (PTE) in the "page table".

A PTE includes information of, for example, a presence flag indicating whether or not a page is present on the main memory device exemplified by the DRAM 3 or the non-volatile memory 4, a physical address of the main memory device exemplified by the DRAM 3, a reading/writing flag indicating whether the page is read only or writable. A PTE in the page table 31 specifies a page on the DRAM 3, and a PTE in the LBA table 41 specifies a page on the non-volatile memory 4. An offset presents a position of offset in a page. The "address" of the position of offset in a page is a physical address or an LBA associated with a virtual address.

As described above, the address conversion process from a virtual address to a physical address in the DRAM 3 or to an LBA in the SSD 5 may be executed by searching in a unit of a bit region obtained by divided the virtual address from the upper bit of the virtual address.

Since searching in the page table 31 using a virtual address alternatively selects one of the page table 31 and the LBA table 41, which can be considered that the LBA table 41 is merged into the page table 31.

(1-3) Comparative Example of Storage Access:

In case where data is present in a storage device as a result of searching in a page table on the basis of a virtual address in a traditional method for storage access, the MMU replies to the OS with a page fault and the OS carries out address conversion from the virtual address to an LBA.

Hereinafter, description will now be made in relation to an example of operation for storage access performed in a computer 100 of FIG. 5 in the above traditional method as a comparative example with the computer 1 of the present embodiment.

Figure 5:
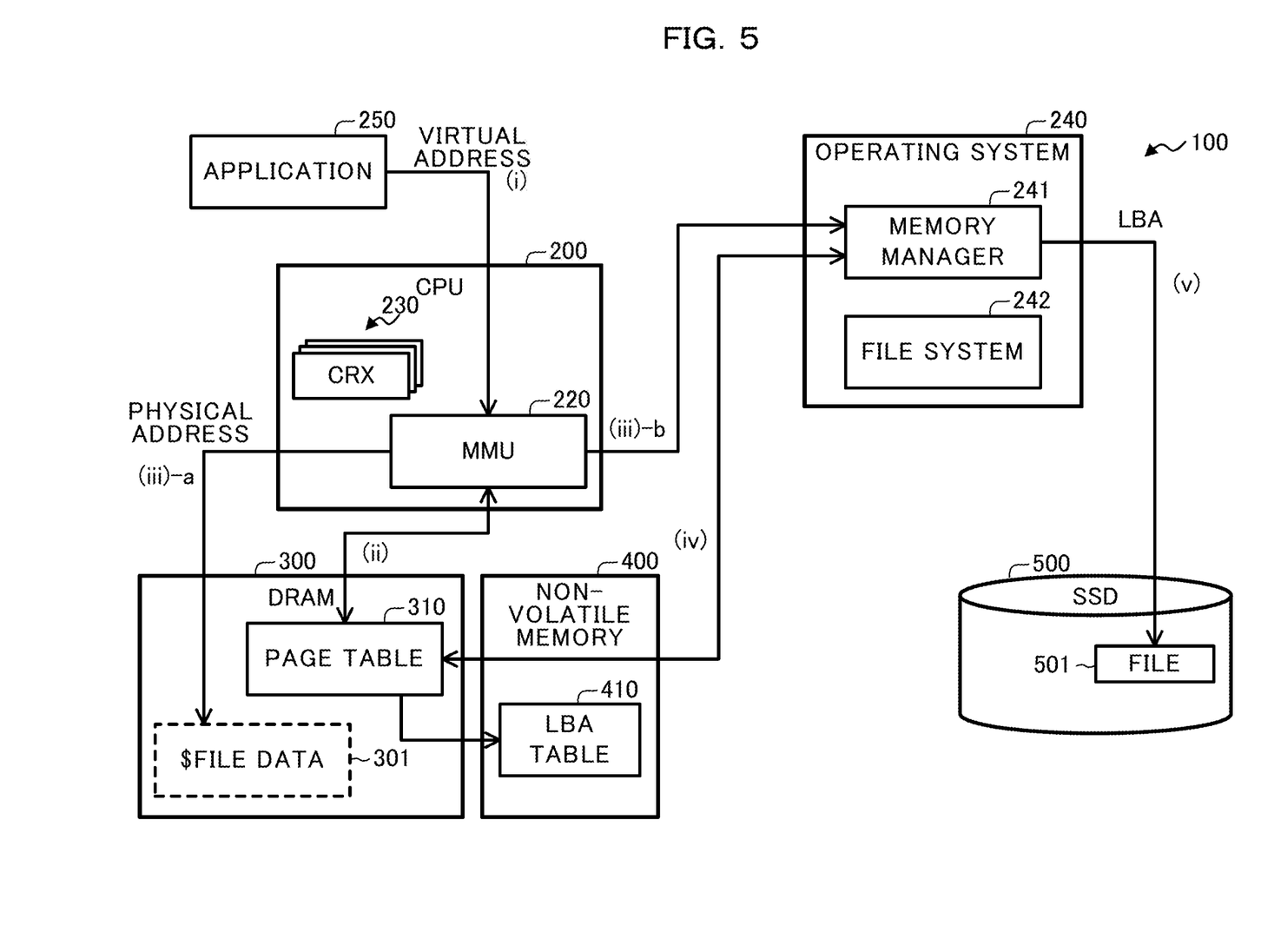
FIG. 5 is a block diagram schematically illustrating an operation performed by a computer according to a comparative example.
Figure 6:
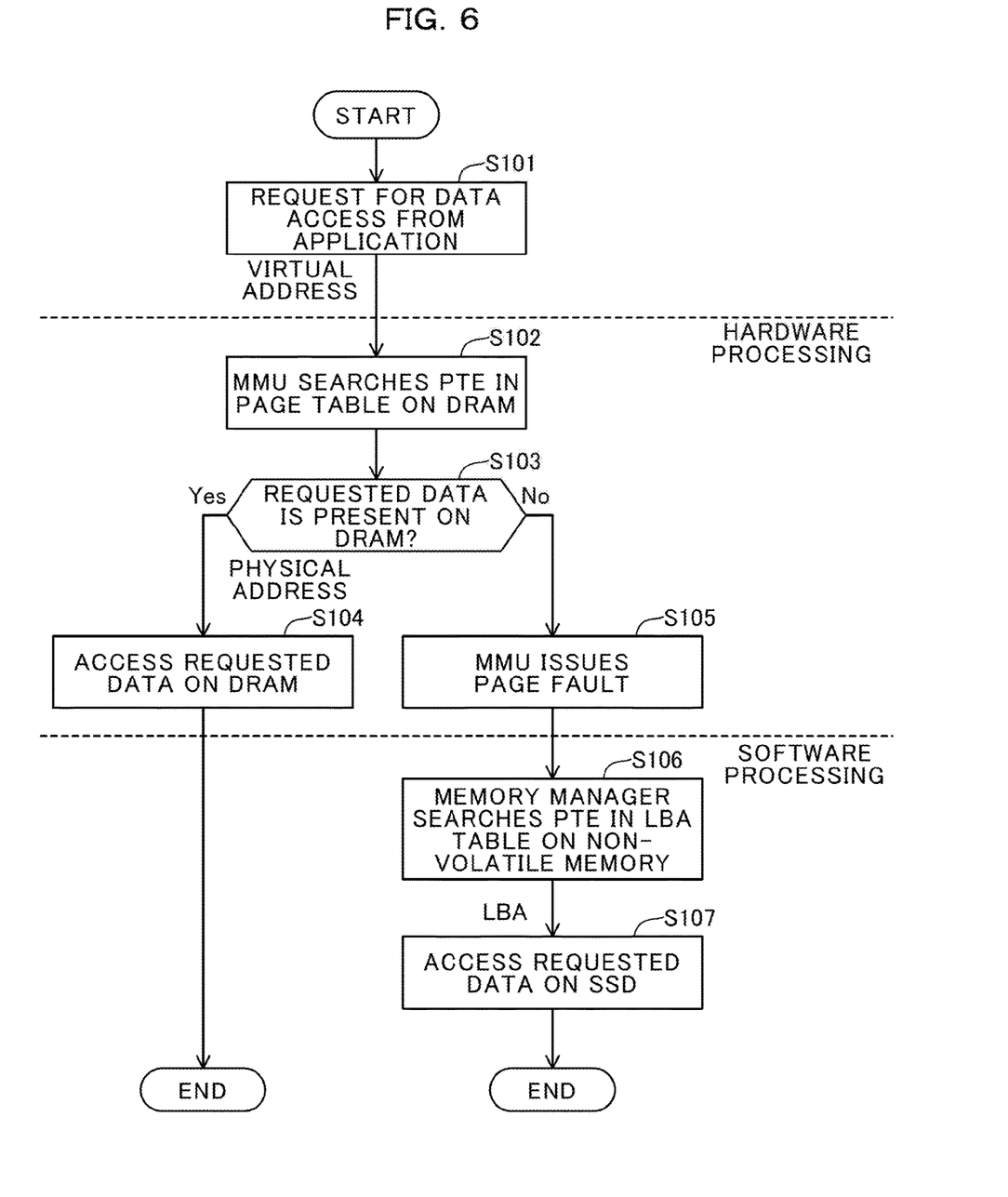
FIG. 6 is a flow diagram illustrating a succession of procedural steps performed by a computer according to a comparative example.

As illustrated in FIG. 5, the application 250 generates a request for data access designating a virtual address (see reference symbol (i), and Step S101 of FIG. 6). The MMU 220 of the CPU 200 searches a PTE in a page table 310 on the DRAM 300 on the basis of the virtual address (see reference symbol (ii), and Step S102 of FIG. 6)

If the requested data is determined to exist on the DRAM 300 as a result of the searching (Step S103 of FIG. 6 and Yes in Step S103), the MMU 220 accesses file data 301 on the DRAM 300 (see reference symbol (iii)-a, and Step S104 of FIG. 6). In FIG. 5, the file data 301 is represented by "$FILE DATA". The access to the file data 301 is targeted for a physical address set in the PTE specified as a result of the searching in the page table 310. Thereby, a process performed when the requested data is present on the DRAM 300 is ended.

If the requested data is determined not to exist on the DRAM 300 as a result of the searching (No in Step S103 of FIG. 6), the MMU 220 sends a page fault to the memory manager 241 of the OS 240 (see reference symbol (iii)-b, and Step S105 of FIG. 6).

The memory manager 241 detects occurrence of the page fault and then searches a PTE in the LBA table 410 on the non-volatile memory 400 on the basis of the virtual address (see reference symbol (iv), and Step S106 of FIG. 6). In this searching, the memory manager 241 searches the virtual address from the upper bit regions for the page table 310, and refers to the LBA table 410 when searching in the PMD region, and obtains (extracts) an LBA designated by the offset region from the PTE designated in the PT region.

The memory manager 241 accesses the LBA of a file 501 on the SSD 500 (see reference symbol (v), and Step S107 of FIG. 6). Thereby, a process per formed when the requested data is present on the SSD 500 is ended.

As described above, in cases where the requested data exists on the SSD 500, searching a PTE in the LBA table 410 and access to the SSD 500 (Steps S106 and S107 of FIG. 6) are executed as a software process by the computer 100 of the comparative example. Consequently, the searching in the page table 310 and the LBA table 410 by the memory manager 241 comes to be overhead in storage access capability.

(1-4) Example of Operation of a Computer in the Present Embodiment:

The computer 1 of the present embodiment can enhance the access capability to storage by merging the software process to the hardware process in the following manner.

Hereinafter, description will now be made in relation to an example of the configuration of the MMU 22 and the OS 211 of the present embodiment. As exemplarily illustrated in FIG. 7, in the CPU 2, the OS 211 is executed on the core 21, and the memory manager 212 and the file system 213 are executed as the function of the OS 211. The application 214 is executed on the OS 211. The OS 211 (e.g., the memory manager 212) controls access to data stored in the SSD 5 by using an LBA.

Upon obtaining a request for data access designating a virtual address from the application 214 (see reference symbol (i)), the MMU 22 searches for a PTE in the page table 31 on the DRAM 3 and the LBA table 41 on the non-volatile memory 4 on the basis of the virtual address (see reference symbol (ii)).

Here, description will now be made in relation to a searching process in the page table 31 and the LBA table 41 by the MMU 22 of the present embodiment.

Figure 8:
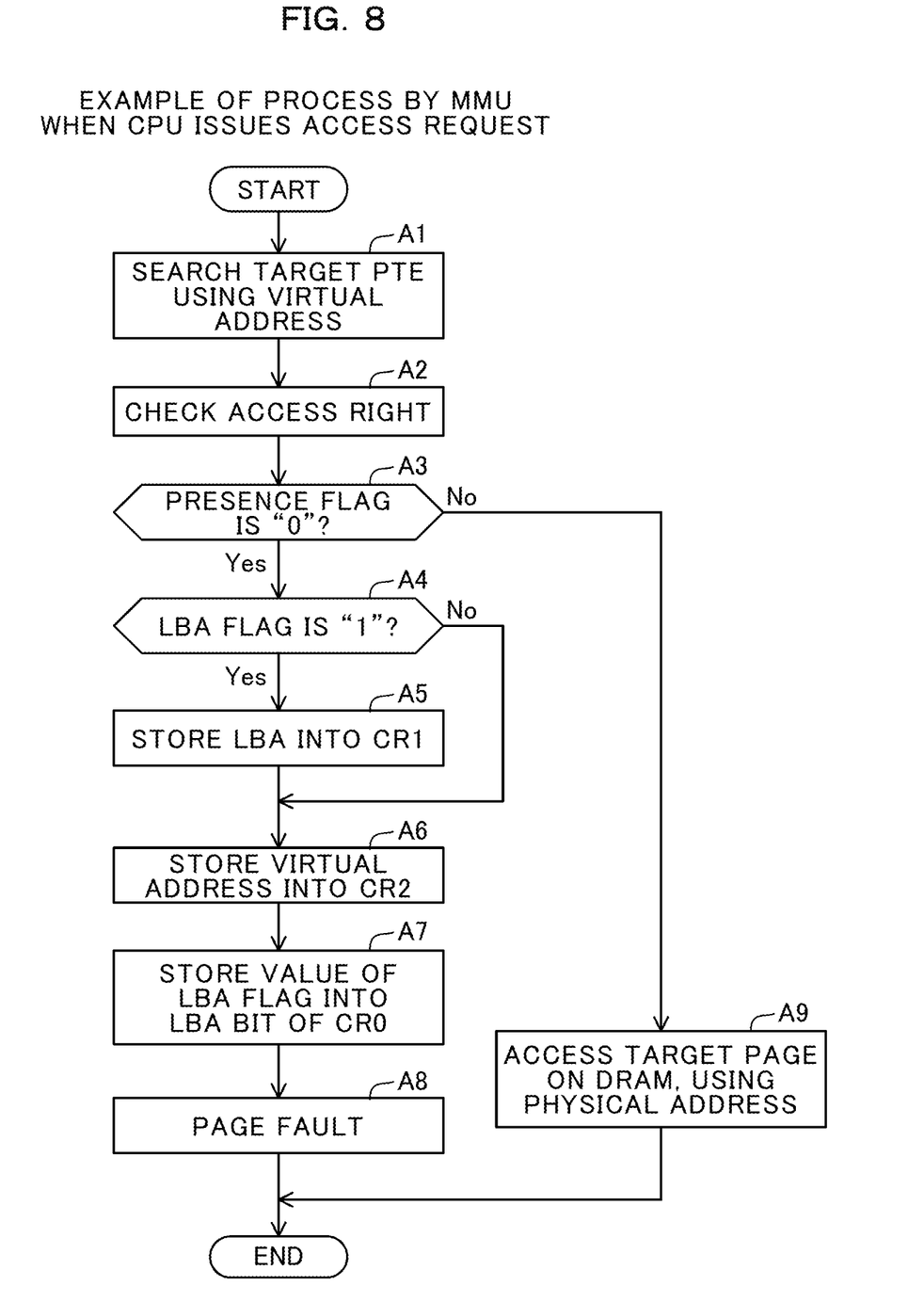
FIG. 8 is a flow diagram illustrating a succession of procedural steps performed by an MMU.

As illustrated in FIG. 8, the MMU 22 searches for a target PTE to be accessed using the virtual address (Step A1). As described above with reference to FIG. 4, a PTE may be searched from the upper bits of the virtual address in a unit of a bit region and specified by a PT in the page table 31 or the LBA table 41 specified by a PMD.

Figure 9:
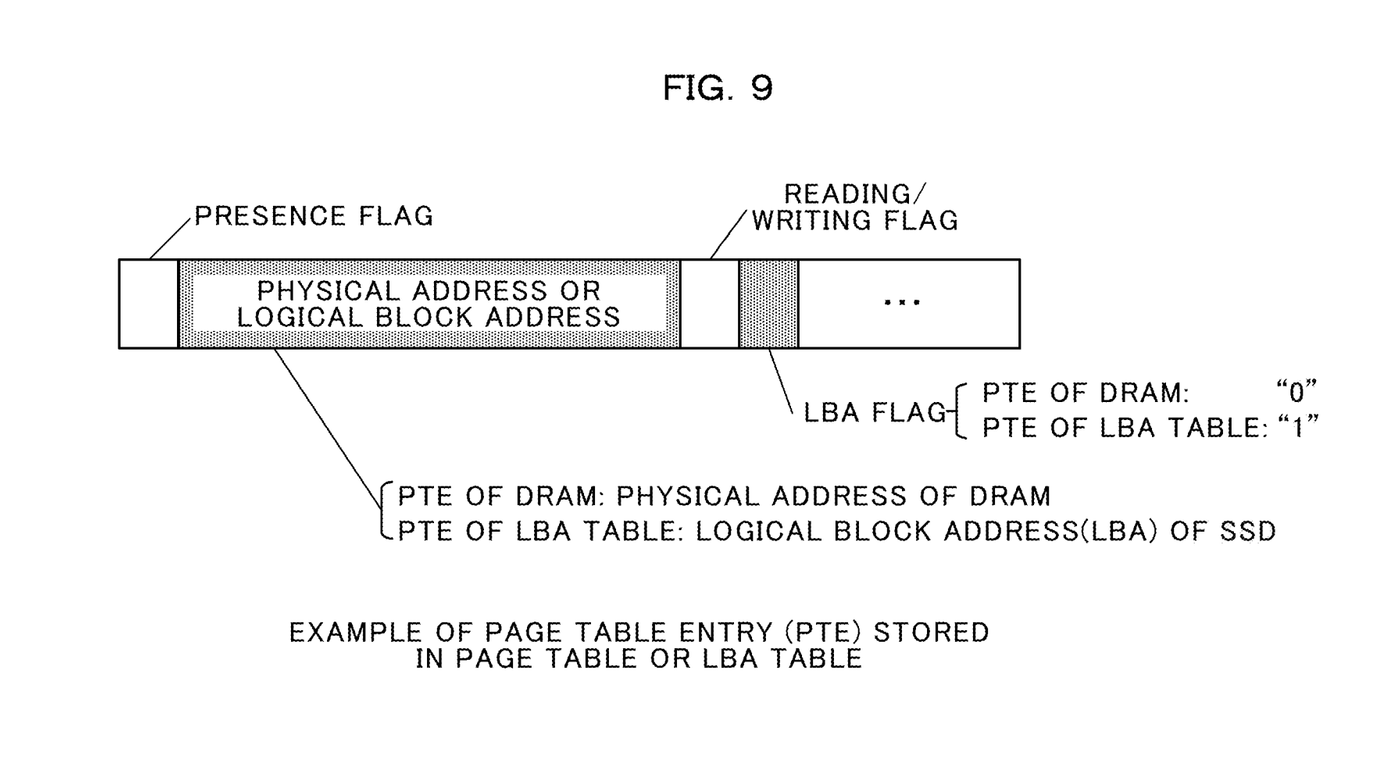
FIG. 9 is a diagram illustrating an example of a page table entry (PTE) according to an embodiment.

Differently from a traditional PTE, the PTE of the present embodiment may have a data structure as illustrated in FIG. 9. As illustrated in FIG. 9, the PTE stored in the page table 31 or the LBA table 41 may exemplarily include a presence flag, a physical address or an LBA, a reading/writing flag, and an LBA flag.

A PTE is an element of the page table 31 and the LBA table 41 that store page information on the main memory device. For example, a PTE includes information of a presence flag indicating whether or not a page is present on the main memory device exemplified by the DRAM 3 or the non-volatile memory 4, a physical address or an LBA, a reading/writing flag indicating whether the page is read only or writable, and an LBA flag.

The PTE in the page table 31 may store a physical address of the main memory device exemplified by the DRAM 3 in the region of the physical address or the LBA, and the PTE in the LBA table 41 may store the LBA of the SSD 5 in the region of the physical address or the LBA.

An LBA flag is a flag indicating whether or not the PTE is an entry indicating an LBA, and therefore is an example of the information that the address of the PTE is an LBA. A fixed value "0" may be set in the LBA flag in the PTE of the page table 31, and a fixe value "1" may be set in the LBA flag in the PTE of the LBA table 41.

As described above, the page table 31 and the LBA table 41 of the present embodiment each include a PTE as an example of an entry specified through searching in the multiple bit regions constituting a virtual address. The above configuration of a PTE allows the MMU 22 to search in both page table 31 and the LBA table 41.

The PTE of the page table 31 may be managed by the memory manager 212, and the PTE of the LBA table 41 may be managed by the file system 213. This allows the memory manager 212 to manage the page table 31 in the same manner as the conventional manner. Since the file system 213, which manages the files and the LBAs, manages the LBA table 41, the process can be efficiently accomplished.

Referring back to FIG. 8, the MMU 22 checks whether the application 214 has an access right to access the virtual address (Step A2), and determines whether or not the presence flag of the PTE obtained in Step A1 is "0" (Step A3).

If the presence flag is "0" (Yes in Step A3), the requested data of the virtual address does not exist on the DRAM 3. In this case, the MMU 22 further determines whether or not the LBA flag of the PTE is "1" (Step A4).

If the LBA flag is "1" (Yes in Step A4), the PTE is an element of the LBA table 41, and therefore the MMU 22 is allowed to set information related to the LBA into the CRx 23 (see reference symbol (iii)-b of FIG. 7).

Figure 10:
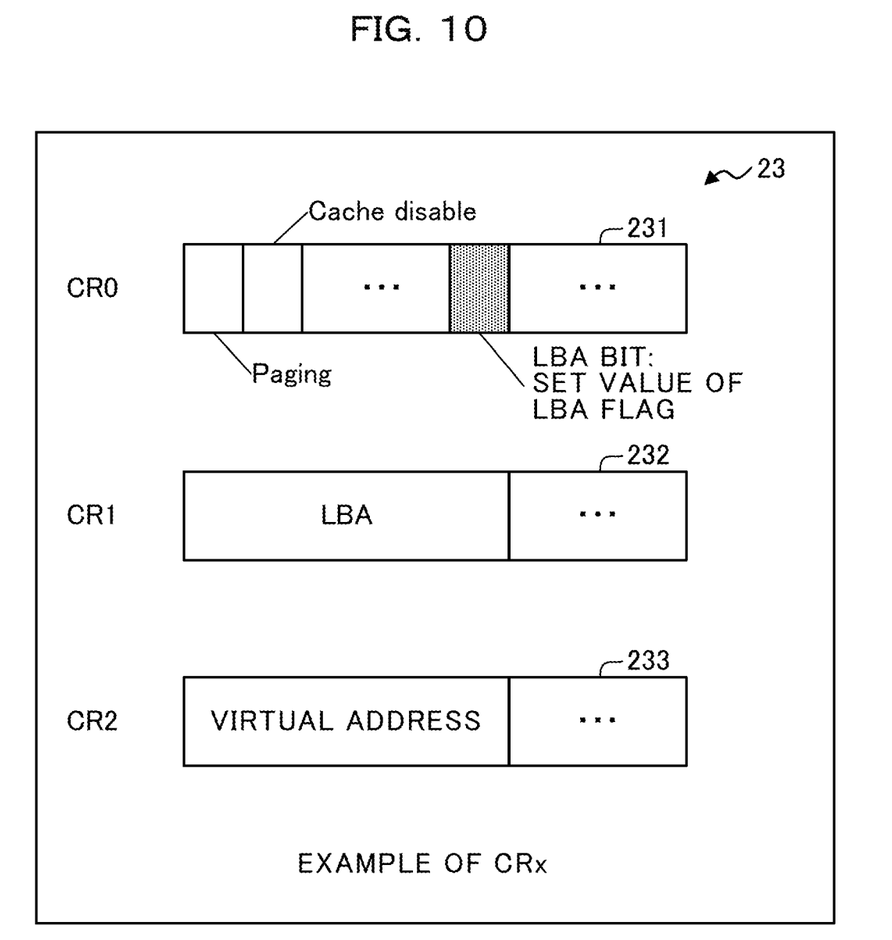
FIG. 10 is a diagram illustrating an example of a CRx according to an embodiment.

Hereinafter, description will now be made in relation to an example of the data structure of the CRx 23 with reference to FIG. 10. As illustrated in FIG. 10, the CR0 among the CRxs 23 may be a register 231 having multiple bits to be used for control (such as "Paging" and "Cache disable"). In the present embodiment, an unused bit among the multiple bits is used as an LBA bit.

Besides, the CR1 and CR2 among the multiple CRxs 23 may be registers 232 and 233 each having a region in which an address can be set. The present embodiment uses these regions as a region for setting an LBA and a region for setting a virtual address.

For example, as illustrated in FIG. 8, in cases where the LBA flag is "1" (Yes in Step A4), the MMU 22 stores the physical address of the PTE or an LBA set in the region of the LBA into, for example, CR1 among the multiple CRxs (Step A5).

Then, the MMU 22 stores the virtual address designated by the application 214 into, for example, the CR2 among the CRxs 23 (Step A6).

In contrast, in cases where the LBA flag is "0" (No in Step A4), the PTE is an element of the page table 31 (not the LBA table 41) and is used for storing the physical address of the main memory device exemplified by the DRAM 3. However, since the presence flag of the PTE is "0" as the result of the determination made in Step A3 is Yes, the page associated with the PTE does not exist on the main memory device. This means that the physical address associated with the PTE is not mapped. In this case, data is read from the SSD 5 and a physical address is registered in the PTE through a "paging process" (see Step B7 in FIG. 11) that is to be detailed below. Consequently, the MMU 22 skips the Step A5 and stores the virtual address in the CR2 into Step A6.

In succession, the MMU 22 stores the value of the LBA flag set in the LBA bit in the PTE into the region of the "LBA bit" of, for example, the CR0 among the multiple CRxs 23 (Step A7).

Then, since the requested data of the virtual address does not exist on the DRAM 3, the MMU 22 sends a page fault to the memory manager 212 of the OS 211 (Step A8, see reference symbol (iv) in FIG. 7), and ends the process.

The notification of a page fault may include an instruction to make the memory manager 212 refer to the CRx 23, or may include the contents of the CRxs 23 (CR0 to CR2). In other words, the notification of a page fault is an example of a notification that indicates that the access destination is the SSD 5.

In contrast, in cases where the presence flag of the PTE is not "0" in Step A3 (No in Step A3), the requested data of the virtual address exists on the DRAM 3. Accordingly, the MMU 22 accesses the target page on the DRAM 3, using the physical address set in the region of the physical address or the LBA of the PTE (Step A9, see reference symbol (iii)-a of FIG. 7), and then ends the process.

As described above, the MMU 22 of the present embodiment can search in the LBA table 41 on the basis of the PTE having the configuration described above in cases where the requested data related to the virtual address exists on the SSD 5. In other words, the MMU 22 can execute two kinds of address conversion in accordance with a place where the data is stored. This means that, the MMU 22 converts the virtual address into the physical address of the main memory device when the requested data exists on the main memory device and in contrast, can convert the virtual address to the LBA of the SSD 5 if the requested data exists on the SSD 5.

In addition, the MMU 22 is capable of storing the information of the LBA obtained through the searching into the CRx 23 in conjunction with the information of the virtual address, and consequently can facilitate the notification of information related to the access.

As described above, the MMU 22 is an example of memory management circuitry that carries out the following processes. The processes may include a process of address conversion on a first virtual address on the basis of the page table 31 or the LBA table 41 according to the access destination of the first virtual address. The process may further include execution of memory access to a memory region on the basis of the result of the address conversion or execution of notification of the first LBA associated with the first virtual address to the OS 211.

Next, description will now be made in relation to an example of operation of the memory manager 212 in cases where the MMU 22 of the present embodiment generates a page fault.

Figure 11:
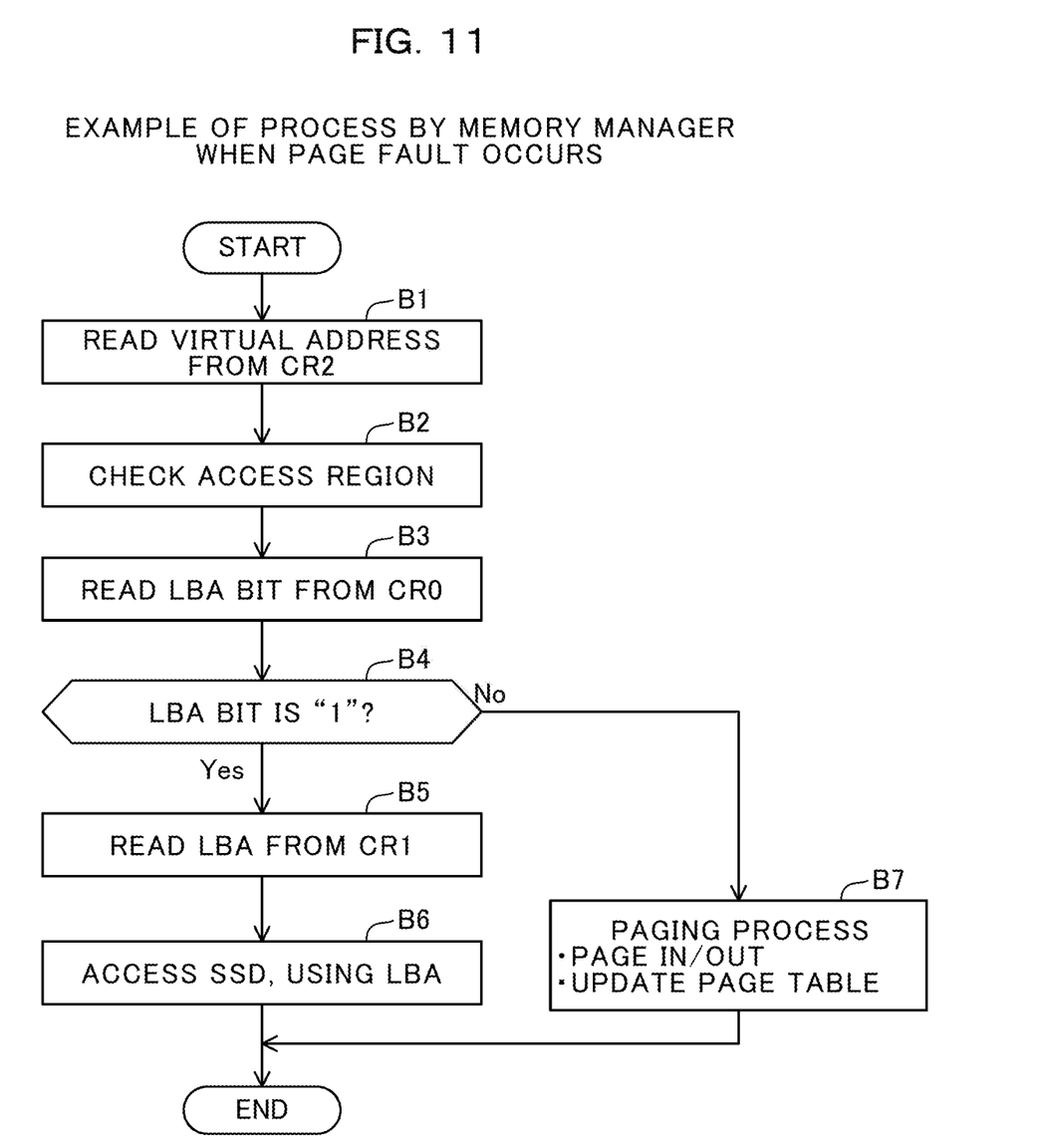
FIG. 11 is a flow diagram illustrating a succession of procedural steps performed by a memory manager.

As illustrated in FIG. 11, the memory manager 212 reads the virtual address from the CR2 (Step B1, see reference symbol (v) of FIG. 7) upon receipt of a notification of a page fault, and checks the access region (Step B2).

The memory manager 212 reads the LBA bit from the CR0 (Step B3) and determines whether or not the LBA bit is "1" (Step B4).

If the LBA bit is "1" (Yes in Step B4), the memory manager 212 reads the LBA from the CR1 (Step B5), accesses the SSD 5 using the LBA (Step B6, see reference symbol (vi) of FIG. 7), and then ends the process. The file system 213 may carry out management such as updating the LBA table 41.

In contrast, if the LBA bit is not "1" (No in Step B4), the requested data is managed by the page table 31 but does not exist on the main memory device. In this case, the memory manager 212 executes paging process (Step B7) and then ends the process. The paging process may include, for example, a process of paging in or paging out, and a process of updating the page table 31.

Next, description will now be made in relation to an example of a series of operation performed in the above computer 1 with reference to FIG. 12.

Figure 12:
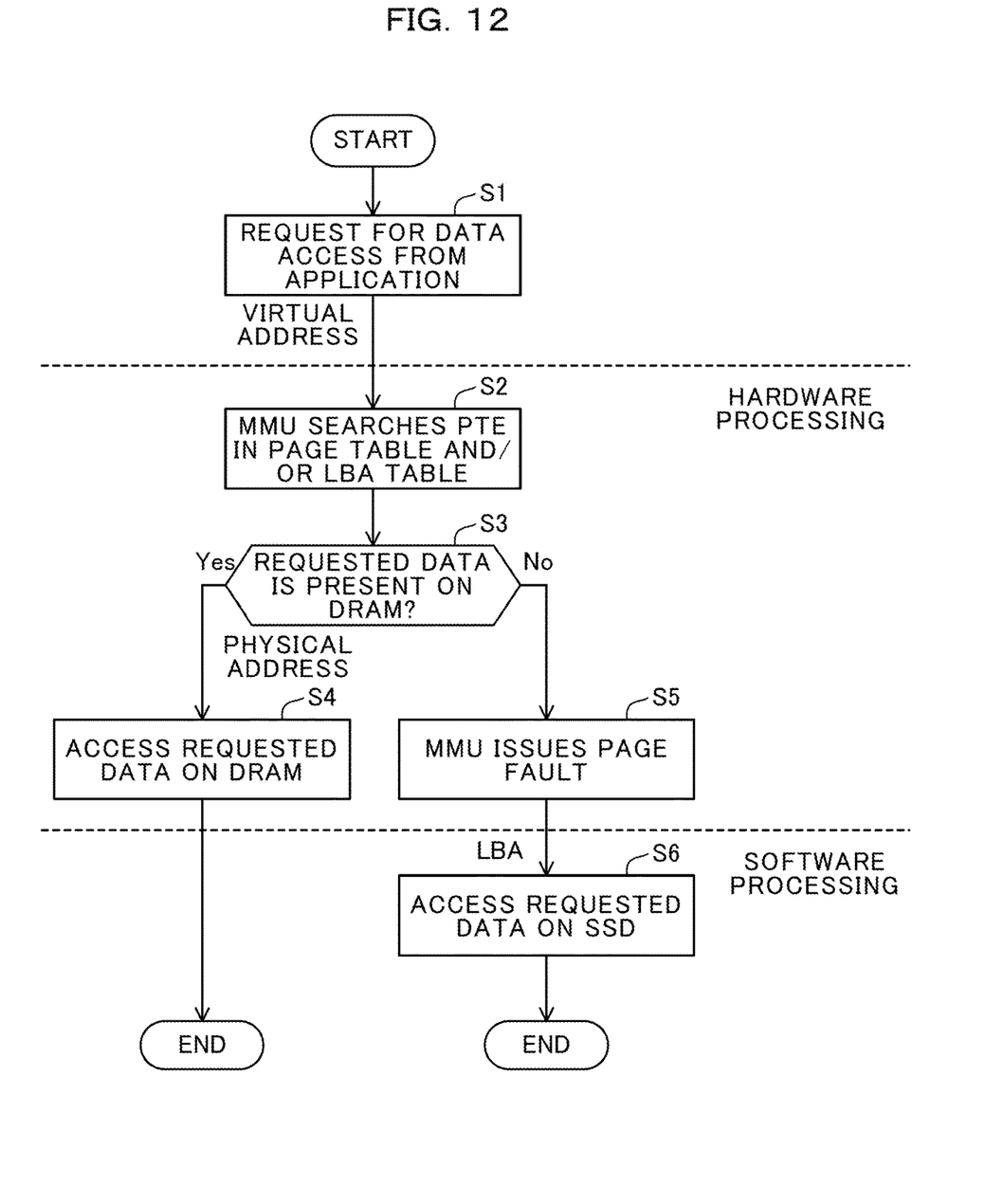
FIG. 12 is a flow diagram illustrating a succession of procedural steps performed by a computer according to an embodiment.

As illustrated in FIG. 12, the application 214 generates a request for data access, designating a virtual address (Step S1). The MMU 22 of the CPU 2 searches for the PTE in the page table 31 on the DRAM 3 and in the LBA table 41 on the non-volatile memory 4 on the basis of the virtual address (Step S2).

If the MMU 22 determines that the requested data exists on the DRAM 3 as a result of the searching (Step S3 and Yes in Step S3), the MMU 22 accesses the file data 30 on the DRAM 3 (Step S4). This access targets for a physical address set in the PTE specified by searching in the page table 31. This ends a process performed in cases where the requested data exists on the DRAM 3.

In contrast, if the MMU 22 determines that the requested data does not exist on the DRAM 3 as a result of the searching (No in Step S3), the MMU 22 sends a page fault to the memory manager 212 of the OS 211 (Step S5).

Upon detection of generation of the page fault, the memory manager 212 obtains the information of the LBA on the SSD 5 by referring to the CRx 23, and accesses the file 50 on the SSD 5, targeting at the obtained LBA (Step S6). This ends a process performed in cases where the requested data exists on the SSD 5.

As described above, even when the requested data exists on the SSD 5, the MMU 22 obtains the information of the LBA in the computer 1 of the present embodiment, so that address conversion, which has conventionally been accomplished by a software process, can be accomplished by a hardware process (see FIG. 12).

Since the present embodiment can accomplish the address conversion in a hardware process, not in a software process, the overhead in capability of storage access can be lowered. Consequently, the performance of the application 214 can be enhanced.

For example, searching for a PTE in the page table 31 and the LBA table 41 by the MMU 22 can carried out for about one microsecond (μs). Therefore, when the SSD 5 has a higher processing speed, the effects caused by reducing the overhead in the storage access capability can be further increased.

An access to the SSD 5 can be easily made at a high speed by the MMU 22 notifying the information of the LBA to the memory manager 212 through the CRx 23.

(2) Miscellaneous

The embodiment described above can be modified and changes as follows.

For example, the functions of the memory manager 212 and the file system 213 in the OS 211 of FIG. 7 may be combined in arbitrary combination, or each may be divided. The functions of the MMU 22 of FIG. 1 or 7 may be achieved by a combination of multiple circuits.

As an aspect of the embodiment, it is possible to enhance the accessibility to a storage device in an information processing apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a first memory configured to store first conversion information used for converting a virtual address to a physical address of a memory region to access data stored in the memory region, the first memory is a volatile memory including the memory region;
a second memory configured to store second conversion information used for converting a virtual address to a logical block address of a storage device to access data stored in the storage device, the second memory is a non-volatile memory different from the storage device;
a processor coupled to the first memory and the second memory and configured to execute an operating system that controls access to data stored in the storage device using a logical block address; and
memory management circuitry configured to execute a first process or a second process, according to an access destination of a first virtual address, the first process comprising address conversion on the first virtual address using one of the first conversion information and the second conversion information and memory access to the memory region based on a result of the address conversion, the second process comprising notification of a first logical block address associated with the first virtual address to the operating system,
the non-volatile memory and the volatile memory collectively constitute a main memory device.

2. The information processing apparatus according to claim 1, further comprising a register configured to be accessed from the operating system executed by the processor, wherein
when the access destination is the storage device, the memory management circuitry extracts the first logical block address associated with the first virtual address by referring to the second conversion information and stores the first logical block address into the register.

3. The information processing apparatus according to claim 2, wherein when the processor executes the operating system and when the processor receives a notification indicating that the access destination is the storage device from the memory management circuitry, the processor extracts the first logical block address by referring to the register.

4. The information processing apparatus according to claim 1, wherein:
the first conversion information and the second conversion information each include an entry specified by searching in a plurality of bit regions of a virtual address;
a physical address associated with the virtual address is set in the entry of the first conversion information; and
a logical block address associated with the virtual address, and information indicating that an address of the entry is a logical block address are set in the entry of the second conversion information.

5. The information processing apparatus according to claim 1, wherein:
the first conversion information is managed by a memory manager included in the operating system executed by the processor; and
the second conversion information is managed by a file system included in the operating system executed by the processor.

6. A method of processing information comprising:
at memory management circuitry, executing address conversion on a first virtual address according to an access destination of the first virtual address, the address conversion being based on first conversion information or second conversion information, wherein
the first conversion information is stored in a first memory and is used for converting a virtual address to a physical address of a memory region to access data stored in the memory region, the first memory is a volatile memory including the memory region,
the second conversion information being stored in a second memory and being used for converting a virtual address to a logical block address of a storage device to access data stored in the storage device, the second memory is a non-volatile memory different from the storage device, and
the process further comprises:
at memory management circuitry,
executing a first process or a second process, according to a result of the address conversion, the first process comprising memory access to the memory region, the second process comprising notification of a first logical block address associated with the first virtual address to an operating system that controls access to data stored in the storage device using a logical block address,
the non-volatile memory and the volatile memory collectively constitute a main memory device.

7. The method according to claim 6, further comprising
at the memory management circuitry,
when the access destination is the storage device,
extracting the first logical block address associated with the first virtual address by referring to the second conversion information and storing the first logical block address into a register configured to be accessed from the operating system.

8. The method according to claim 7, further comprising
at the operating system executed by a processor,
upon receipt of a notification indicating that the access destination is the storage device from the memory management circuitry, extracting the first logical block address by referring to the register.

9. The method according to claim 6, wherein:
the first conversion information and the second conversion information each include an entry specified by searching in a plurality of bit regions of a virtual address;
a physical address associated with the virtual address is set in the entry of the first conversion information; and
a logical block address associated with the virtual address, and information indicating that an address of the entry is a logical block address are set in the entry of the second conversion information.

10. The method according to claim 6, wherein:
the first conversion information is managed by a memory manager included in the operating system executed by the processor; and
the second conversion information is managed by a file system included in the operating system executed by the processor.

* * * * *